No. 776,280. PATENTED NOV. 29, 1904.
S. R. WELCH.
INSECT TRAP.
APPLICATION FILED JAN. 5, 1904.
NO MODEL.

Witnesses

Inventor
Stephen R. Welch
Attorney

No. 776,280.                                    Patented November 29, 1904.

UNITED STATES PATENT OFFICE.

STEPHEN R. WELCH, OF GRAND JUNCTION, COLORADO.

INSECT-TRAP.

SPECIFICATION forming part of Letters Patent No. 776,280, dated November 29, 1904.

Application filed January 5, 1904. Serial No. 187,769. (No model.)

*To all whom it may concern:*

Be it known that I, STEPHEN R. WELCH, a citizen of the United States, residing at Grand Junction, in the county of Mesa and State of Colorado, have invented certain new and useful Improvements in Insect-Traps, of which the following is a specification.

My invention relates to traps for catching and destroying cocoon-spinning worms, and is especially designed to be used for catching the larva of the codling-moth, commonly called the "apple-worm," and destroying the moth that develops therefrom.

The invention described herein is another form of trap of the same general construction and to be used for the same purpose as the trap described in an application for patent filed by me on December 9, 1903, and given Serial No. 184,486.

The construction and operation of my invention will fully appear hereinafter, and by reference to the accompanying drawings, in which—

Figure 1:
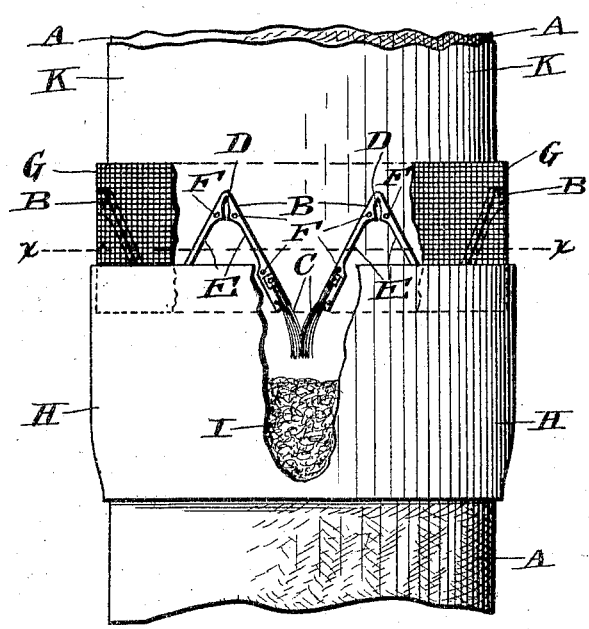
Figure 2:
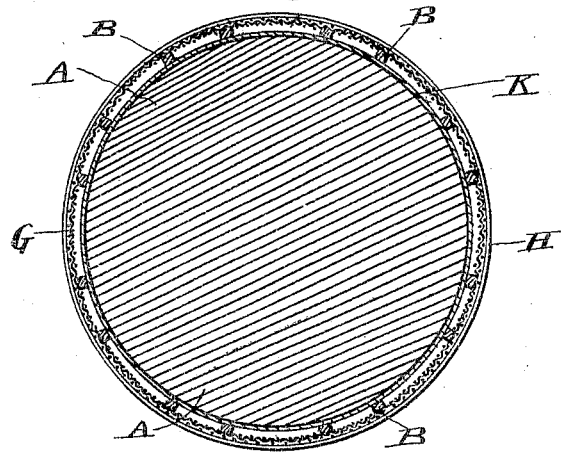
Figure 3:
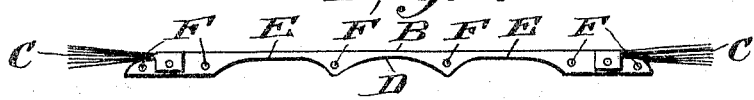

Figure 1 is a view in elevation of a fragment of a tree, showing my trap in position thereon; Fig. 2, a view in cross-section of the trap and tree, and Fig. 3 a detail view of one of the entrance-spacing strips.

In the drawings similar reference characters indicate corresponding parts throughout the several views.

A represents the trunk of a tree.

B represents strips made of hard rubber, leather, or other easily-flexed material having brush-faces C secured to each end and the part intermediate of the brush-faces weakened by hollowed-out portions D and E, the part D being in the middle of the strip and the parts E between D and the ends of said strip.

The strips B are bent in their centers, forming inverted-V-shaped structures, and secured around the trunk A by means of nails passed through holes F in the strip. When the strips are thus bent, the hollowed-out portions E add to the space between the legs of the inverted V's for the purpose hereinafter stated and at the same time permit the bending of the strip caused by the growth of the tree.

The ends of the V-shaped structures are spaced apart to form openings, the bristles of the brush-faces C, however, intermingling, this structure permitting a worm crawling down the trunk to pass through the openings between the V's, but preventing it from return-
ing the same way should it desire to do so.

G represents a band of transparent material, preferably wire-gauze, secured to the outside edges of the strips B after being secured to the tree-trunk, as above described.

H represents a strip of preferably opaque fabric, such as dark-colored duck, secured to the lower edge of the strip of transparent material G and extending upward far enough to cover the tops of brush-faces C. The lower edge of said strip H is secured to the tree-trunk A, and in the chamber thus formed cotton batting, waste, or other soft fluffy material I is placed.

The apple-worm after emerging from the fruit crawls out on the limb of the tree and downward, seeking a sheltered place to spin its cocoon. Sometimes this is found under a piece of splintered bark on the tree-trunk, but more frequently a suitable place is not found until it reaches the ground. My invention is intended to entice the worm to spin its cocoon in a place where the moth cannot get to the open air and is preferably placed around the tree-trunk immediately below the lowermost limb of the tree. The worm crawling along the surface of the tree enters under the band G and guided by the strips B reaches the brush-faces C, through which it crawls into the dark nesting-chamber formed by the strip H, where it finds an ideal place for spinning its cocoon in the soft material I. After the period of metamorphosis, usually nine days, the moth emerges from the cocoon and immediately seeks the light and air, which enter the trap between the legs of each V, the hollowed-out portions E, as before described, adding to the space for the entrance of light and air. Into one of these light-chambers, which are designated by the character J, the moth flutters, but not being able to get out eventually dies.

At times the surface of the tree where it may be desired to instal a trap is so uneven as to leave openings under the edge of the strips B, through which the moth might crawl. In such a case I find it advisable to first secure a strip of fabric K to the tree-trunk, being careful to tack its top edge down close to the bark of the tree before installing the trap.

Having thus described my invention, what I claim is—

1. In an insect-trap, V-shaped entrances having intermingled brush-faces at their smaller openings, a strip of transparent material secured over said entrances, lighted chambers arranged alternately with said entrances and in the same plane, a strip of opaque fabric secured to said transparent strip and having its free edge suitably secured, and a nest-inducing substance inclosed by said strip of opaque fabric, substantially as shown and described.

2. In an insect-trap, V-shaped entrances having intermingled brush-faces at their smaller openings, a strip of transparent material secured over said entrances, lighted chambers arranged alternately with said entrances and in the same plane, a strip of opaque fabric secured to said transparent strip and having its free edge suitably secured, and soft, fluffy material inclosed by said strip of opaque fabric, substantially as shown and described.

3. In an insect-trap, V-shaped strips suitably secured, a strip of transparent material secured over said V-shaped strips, the spaces between each pair of strips forming entrances to the trap and the space inclosed by each strip forming a lighted chamber, a strip of opaque material secured to said transparent strip and having its free edge suitably secured, and a nest-inducing substance inclosed by said strip of opaque fabric, substantially as shown and described.

4. In an insect-trap, V-shaped strips suitably secured, a strip of wire-gauze fabric secured over said V-shaped strips, a strip of dark-colored fabric secured to the lower end of said strip of wire-gauze fabric, and a nest-inducing substance inclosed by said strip of dark-colored fabric, substantially as shown and described.

5. In an insect-trap, V-shaped strips suitably secured, a strip of wire-gauze fabric secured over said V-shaped strips, a strip of dark-colored fabric secured to the lower end of said strip of wire-gauze fabric, and soft, fluffy material inclosed by said strip of dark-colored fabric, substantially as shown and described.

6. In an insect-trap, in combination with a tree-trunk, strips of flexible material bent to a V shape and secured thereto, the ends of said strips provided with brush-faces, a strip of transparent material secured to the outer edges of said strips, a strip of opaque fabric secured to said transparent strip, the free edge of said strip of opaque fabric secured to the tree-trunk, and a nest-inducing substance inclosed by said strip of opaque fabric and the tree-trunk, substantially as shown and described.

7. In an insect-trap, in combination with a tree-trunk, strips of flexible material bent to a V shape and secured thereto, the ends of said strips provided with brush-faces, a strip of wire-gauze fabric secured to the outer edges of said strips, a strip of dark-colored duck secured to the edge of said wire-gauze fabric and having its free edge secured to the tree-trunk, and cotton-batting in the space inclosed by said duck and the tree-trunk, substantially as shown and described.

8. In an insect-trap, in combination with a tree-trunk, strips of flexible material weakened in the middle and intermediate of the middle and ends, bent to a V shape and secured to the tree-trunk, the ends of said strips provided with brush-faces that intermingle, a strip of transparent material secured over said V-shaped strips, a strip of opaque material secured to said strip of transparent material, the free edge of said opaque strip secured to the tree-trunk, and a nest-inducing substance inclosed by said strip of opaque material and the tree-trunk, substantially as shown and described.

9. In an insect-trap, in combination with a tree-trunk, strips of flexible material weakened in the middle and intermediate of the middle and ends, bent to a V shape and secured to the tree-trunk, the ends of said strips provided with brush-faces that intermingle, a strip of wire-gauze fabric secured to said V-shaped strips, a strip of dark-colored cloth secured to said strip of wire-gauze fabric, the free edge of said dark-colored fabric secured to the tree-trunk, and cotton-batting inclosed by said dark-colored fabric and the tree-trunk, substantially as shown and described.

In testimony whereof I hereto affix my signature in the presence of two witnesses.

STEPHEN R. WELCH.

Witnesses:
U. G. RAMEY,
A. L. PENBERTHY.